July 1, 1958     H. REICH     2,840,998
COUPLINGS

Filed Feb. 23, 1955     2 Sheets-Sheet 1

INVENTOR
Herworth Reich
BY Michael S. Striker
ATTORNEY

July 1, 1958

H. REICH 2,840,998

COUPLINGS

Filed Feb. 23, 1955

INVENTOR
Herworth Reich
BY Michael J. Striker
ATTORNEY though # United States Patent Office 2,840,998
Patented July 1, 1958

2,840,998
COUPLINGS
Herwarth Reich, Bochum, Germany

Application February 23, 1955, Serial No. 490,073

Claims priority, application Germany February 23, 1954

13 Claims. (Cl. 64—12)

The present invention relates to couplings, the couplings of which are connected together by a set of intermediate members of arcuate cross-section which are made of rubber or similar elastic material. For the purpose of absorbing the forces that are to be transmitted, the intermediate members are provided with a plurality of insertions, especially filamentous insertions of great strength but of low elasticity. Since the insertions, which extend from one coupling disc to the other, are embedded in the arcuate intermediate members, the elastic mass surrounding them counteracts the stretching of the insertions, so that, the intermediate members remain elastic and consequently absorb torque impacts and axial, radial and angular displacements of the coupling discs in relation to each other.

In couplings of the aforesaid kind, it has been found that the elastic mass, in which the insertions have been embedded, does not produce a sufficient stiff intermediate member especially if the intermediate member is not in the form of a complete ring. The result of the insufficient rigidity is that the less elastic insertions stretch under load. In the region of these less elastic insertions, the intermediate member loses the original arcuate shape of the cross-section. The intermediate member undergoes great deformations in the region of the end portions of the intermediate member. The great stress to which the intermediate member is subjected causes a rapid fatiguing of the material and a high degree of heating of the intermediate member. Herein lie the causes of the comparatively short life of the intermediate members according to the known art. With the stretching of the insertions, the clutch also loses its rotary elastic effect, so that the insertions then tear at comparatively small torque impacts.

This drawback is obviated by the present invention by making provision for an effective stiffening of the intermediate member.

According to the invention, it is proposed to provide the intermediate members, in addition to insertions which extend obliquely from one coupling disc to the other, with insertions which extend along the end sides arcuately in accordance with the shape of the intermediate member and which extend up to the region where the intermediate members are fixed to the coupling discs and which, like the other insertions, are embedded in the elastic mass of the intermediate members.

It is advantageous to keep the intermediate members as compact as possible, since couplings, which have to transmit torques of different magnitudes can then within a certain range, be equipped with intermediate members of a uniform size by arranging a suitable number of intermediate members on a corresponding diameter. In that case, the insertions which extend along both sides of the intermediate members are formed of a thread wound into an endless strand.

As is also proposed by the invention, there are to be provided as insertions, together with the insertions which extend along the lateral edges of the intermediate members, further insertions forming the shape of a figure 8, the latter being fixed on the coupling discs. The insertions which are thus provided in the intermediate member bound substantially triangular areas which are filled by the elastic mass of the intermediate members and thus produce the intermediate member of arcuate cross-section. The triangular areas, which are filled by the elastic mass and are bounded by the less elastic insertions assure rigidity of shape with a sufficient elasticity of the intermediate members.

It is also advantageous to place the insertions as far as possible along the outer arc of the intermediate members. The insertions then act as a cage for the elastic mass that is subjected to centrifugal force. In this way, the intermediate members are further stiffened since the insertions are then prevented from stretching.

As the invention further proposes, the insertions forming the shape of a figure 8 are, like the insertions extending along the end sides of the intermediate members, formed by winding a thread into an endless strand which is then twisted into the shape of a figure 8. In order that the whole strand should be converted into the form of a figure 8, bunches of thread cross one another. In this way, in contradistinction to the insertions in which individual threads cross one another, the danger that the individual threads will tear or cut one another upon deformation of the intermediate member is eliminated, as far as possible.

Finally, it is to be pointed out that it is advantageous to superimpose the insertions in the direction of the holding pressure, since the intermediate member in then comparatively inelastic at its clamped positions and, consequently, the intermediate members cannot be pulled out so easily from the coupling disks.

In order to obtain a reliable attachment of the intermediate members, even with comparatively small holding forces, the insertions, at least the loops of the insertions forming the shape of a figure 8, are, in accordance with a further feature of the invention, embedded in a formclosed manner in corresponding recesses in the coupling discs. The kidney-shaped lugs, which remain on the coupling discs, extend into corresponding recesses in the inner side of the intermediate members.

The intermediate members are kept in the recesses in the coupling disc by a ring which rests against the outer side of the intermediate members and which, at the fixing of the intermediate members, is pulled towards the coupling disc.

Another possible method of fixing the intermediate members consists in providing the coupling discs with lugs which extend between the individual intermediate members. The lugs render it possible to fix the intermediate members between a coupling disc and a machine element which extends beyond the region of the intermediate members.

In order to protect the lugs from excessive bending stresses when the bolts are tightened, they are provided with projections which are located outside the circle of screw holes and which support them on the machine part.

The invention is represented by way of example by the accompanying drawings, of which:

Figure 4:
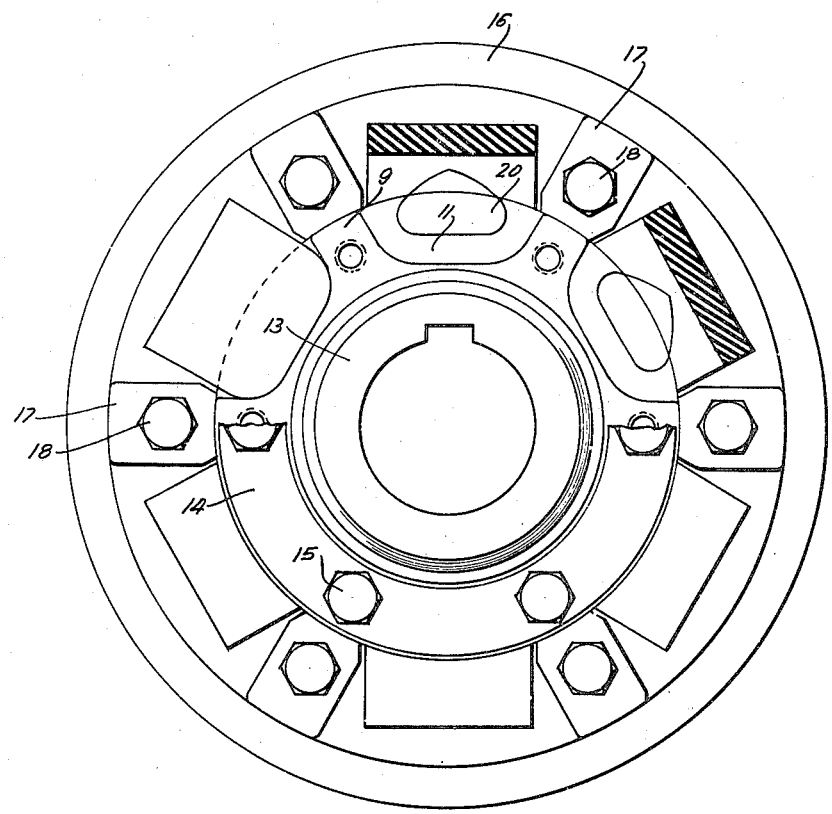

Figure 3 again shows in perspective representation, the arrangement of the insertions in the coupling members, with the omission of the elastic mass;

Figure 4 shows the entire coupling in side elevation; and

Figure 5:
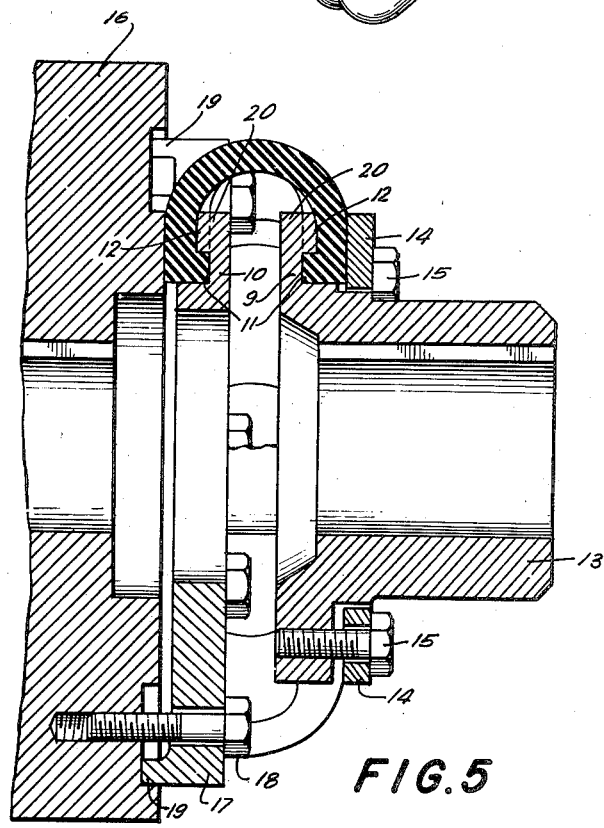

Figure 5 shows the coupling in an axial section.

Figure 1:
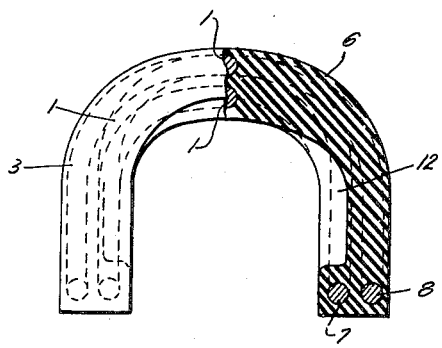
Figure 1 shows an intermediate coupling member in end elevation, partly in section.
Figure 2:
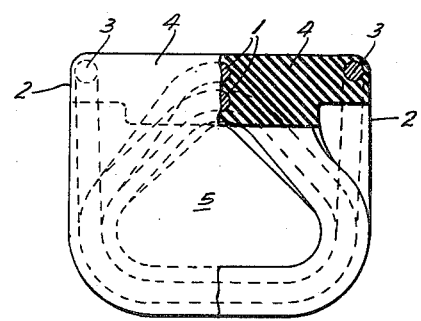
Figure 2 shows an intermediate coupling member in side elevation, partly in section.

The intermediate coupling member, which is represented in Figures 1 and 2 and which has an arcuate U-shaped cross-section, is made of rubber or a similar elastic material and comprises insertions embedded in this elastic mass. One reinforcing means has oblique crossing portions, and transverse portions 7. The coupling member has a second reinforcing means having V-shaped portions 3 which extend along the V-shaped portions 2 and which, together with the elastic mass in which the insertions 1 and 3 are embedded, produce the stiffening of the intermediate member. Both the insertions 1, 7 and the insertions 3, 8 are wound from thread into an endless strand. The strand which forms the insertions 1, 7 is, in addition, by twisting, converted into the shape of a figure 8, so that its crossing portions form the insertions which extend obliquely from one side to the other of the intermediate member.

Figure 3:
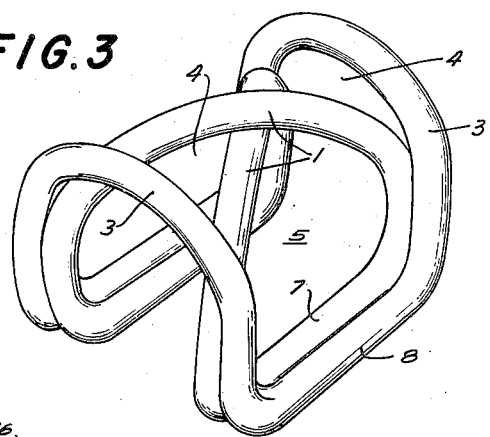

As can be seen from Figures 2 and 3, the sections 4 and 5 of the coupling member, which are located between the insertions 1, 7 and 3, 8 and are filled with the elastic mass, have a substantially triangular shape. In this way, a specially good stiffening of the intermediate member is produced. In addition, the reinforcing means 1, 7 and 3, 8 extend as far as possible along the V-shaped lateral edges 6 of the intermediate coupling member and thus form a cage for the elastic mass of the intermediate member which is subjected to centrifugal force. The centrifugal forces of the elastic mass which are intercepted by the reinforcing means counteract the stretching of the insertions and thus produce an additional stiffening of the shape.

The portions 7 and 8 which extend through the attaching region of the intermediate coupling member, are superimposed on each other in the direction of the attaching pressure, so that the intermediate member is comparatively inelastic in the regions of attachment.

Figures 4 and 5 show the fixing of the intermediate members on the coupling discs. The coupling discs 9 and 10 are provided with recesses 11 in which the intermediate coupling members are embedded at least together with the portions 7 of the insertions 1. There is thus produced a form-closed connection of the intermediate members with the coupling discs. The kidney-shaped lugs 20, which remain on the coupling discs 9 and 10, engage in recesses 12 in the inner side of the intermediate coupling members. Since the insertions 1 of the intermediate members which take up the forces that are to be transmitted by the coupling, are embedded in the recesses 11 in the coupling discs 9 and 10, the intermediate members need not be fixed firmly but they only have to be kept in the recesses 11 in the coupling discs 9 and 10. For this purpose, the coupling disc 9 is formed as a flange of the hub 13. The ring 14, which is pulled towards the coupling disc 9 by means of the screws 15, keeps the intermediate members, on one side of the coupling, with a slight pressure in the recesses 11 in the coupling disc 9. On the other side of the coupling this possibility is not provided, since, there, the intermediate members are connected with a machine element 16, for example of a flywheel or braking disc, a toothed wheel, or a shifting coupling, which extends considerably beyond the fitting-in diameter of the intermediate members. Consequently, the coupling disc 10 is here provided with lugs 17 which extend between adjacent intermediate members. In order that the lugs 17 should not break even with excessively great tightening of the screws 18, they are provided with projections 19 which are supported on the machine part 16. The projections 19 lie outside the diameter of the circle on which the bolts 18 are located, so that the attaching pressure, which the coupling ring 10 exerts on the intermediate members, can be still further increased, with bending of the lugs 17, even when the projections 19 rest on the counter-member 16.

What I claim is:

1. An elastic coupling comprising, in combination, two oppositely arranged rotary coupling discs; a set of elastic coupling members arranged spaced from each other along the peripheral portions of said coupling discs, each coupling member consisting of a resilient material and including a yoke portion and two leg portions having free end portions respectively secured to said coupling discs, each coupling member having a pair of lateral edges bounding said yoke portion and said leg portions; first reinforcing means embedded in said coupling member and including oblique portions crossing each other in said yoke portion of said coupling member; and second reinforcing means embedded in said coupling member and including a pair of reinforcing portions respectively extending along said lateral edges and into said end portions of said coupling member.

2. An elastic coupling comprising, in combination, two oppositely arranged rotary coupling discs; a set of elastic coupling members arranged spaced from each other along the peripheral portions of said coupling discs, each coupling member consisting of a resilient material and including a yoke portion and two leg portions having free end portions respectively secured to said coupling discs, each coupling member having a pair of lateral edges bounding said yoke portion and said leg portions; first reinforcing means embedded in said coupling member and including oblique portions crossing each other in said yoke portion of said coupling member, curved portions located at said lateral edges of said coupling member, and transverse portions located in said free end portions of said coupling member, said first reinforcing means consisting of cords wound in an endless 8-shaped strand; second reinforcing means embedded in said coupling member and including a pair of lateral reinforcing portions respectively extending along said lateral edges and into said end portions of said coupling member; and a pair of transverse portions respectively connecting the ends of said lateral reinforcing portions of said second reinforcing means and being located in said free end portions of said coupling member, said second reinforcing means consisting of cords wound in an endless strand.

3. An elastic coupling comprising, in combination, two oppositely arranged rotary coupling discs; a set of elastic coupling members arranged spaced from each other along the peripheral portions of said coupling discs, each coupling member consisting of a resilient material and including a yoke portion and two leg portions having free end portions respectively secured to said coupling discs, said free end portions having transverse edges, each coupling member having a pair of lateral edges bounding said yoke portion and said leg portions; first reinforcing means embedded in said coupling member including oblique portions crossing each other in said yoke portion of said coupling member, curved portions located at said lateral edges of said coupling member, and transverse portions located in said free end portions of said coupling member, said first reinforcing means consisting of cords wound in an endless 8-shaped strand; second reinforcing means embedded in said coupling member and including a pair of lateral reinforcing portions respectively extending along said lateral edges and into said end portions of said coupling member; and a pair of transverse portions respectively connecting the ends of said lateral reinforcing portions of said second reinforcing means and being located in said free end portions of said coupling member, said second reinforcing means consisting of cords wound in an endless strand, said transverse portions of said first and second reinforcing means extending adjacent to each other along said transverse edges of said free end portions of said coupling member.

4. An elastic coupling comprising, in combination, two oppositely arranged rotary coupling discs having opposite inner faces respectively formed with a plurality of recesses, each recess having a center portion extending along a chord and two end portions opening on the periphery of the respective coupling discs, said recesses defining inwardly projecting lugs on said inner faces of said coupling discs; a set of elastic coupling members arranged spaced from each other along the peripheral portions of said coupling discs, each coupling member consisting of a resilient material and including a yoke portion and two leg portions having free end portions respectively secured to said coupling discs, each coupling member having a pair of lateral edges bounding said yoke portion and said leg portions, said coupling members being arcuate and having an inner face formed with a pair of opposite recesses located in the region of said leg portions and receiving opposite projecting lugs of said two coupling discs; first reinforcing means embedded in said coupling member and including oblique portions crossing each other in said yoke portion of said coupling member, curved portions located at said lateral edges of said coupling member, and transverse portions located in said free end portions of said coupling member, said first reiforcing means consisting of cords wound in an endless 8-shaped strand having two loops surrounding, respectively, said recesses in said coupling member for reinforcing the same against the forces exerted by said lugs of the coupling discs; and second reinforcing means embedded in said coupling member and including a pair of lateral reinforcing portions respectively extending along said lateral edges of said coupling member and a pair of transverse portions respectively connecting the ends of said lateral reinforcing portions and being located in said free end portions of said coupling member, said second reinforcing means consisting of cords wound in an endless strand.

5. A coupling as claimed in claim 4 wherein said transverse portions of said first and second reinforcing means are located adjacent each other in said end portions of said coupling member and in planes extending parallel to the axis of said coupling discs; and including means for clamping said free end portions of said coupling members to said coupling discs.

6. A coupling as claimed in claim 4 wherein one of said coupling discs has a plurality of radially and outwardly projecting lugs extending between adjacent coupling members; and threaded bolt means passing through said outwardly projecting lugs for attaching said one coupling disc.

7. A coupling means comprising an elastic U-shaped coupling member consisting of a resilient material and including a yoke portion curved in one direction only and two leg portions having free end portions adapted to be attached to a pair of coupling discs, said coupling member having a pair of lateral U-shaped edges bounding said yoke portion and said leg portions and a pair of transverse edges along said free end portions; first 8-shaped reinforcing means embedded in said coupling member and including oblique portions crossing each other in said yoke portion of said coupling member and extending to the ends of said lateral edges, and a pair of transverse portions located in said free end portions along said transverse edges and being integral with said oblique portions; and second reinforcing means embedded in said coupling member and including a pair of U-shaped lateral reinforcing portions respectively extending along said U-shaped lateral edges and into said end portions and a pair of transverse portions respectively connecting the ends of said lateral U-shaped reinforcing portions and being located along said transverse edges of said free end portions of said coupling member.

8. A coupling means comprising an elastic U-shaped coupling member consisting of a resilient material and including a yoke portion curved in one direction only and two leg portions having free end portions adapted to be attached to a pair of coupling discs, said coupling member having a pair of lateral U-shaped edges bounding said yoke portion and said leg portions and a pair of straight transverse edges along said free end portions; first 8-shaped reinforcing means embedded in said coupling member and including oblique portions crossing each other in said yoke portion of said coupling member and extending to the ends of said lateral edges, and a pair of transverse portions located in said free end portions along said transverse edges and being integral with said oblique portions; and second reinforcing means embedded in said coupling member and including a pair of U-shaped lateral reinforcing portions respectively extending along said U-shaped lateral edges and into said end portions and a pair of transverse portions respectively connecting the ends of said lateral U-shaped reinforcing portions and being located along said transverse edges of said free end portions of said coupling member.

9. A coupling means comprising an elastic U-shaped coupling member consisting of a resilient material and including a yoke portion curved in one direction only and two leg portions having free end portions adapted to be attached to a pair of coupling discs, said coupling member having a pair of lateral U-shaped edges bounding said yoke portion and said leg portions and a pair of transverse edges along said free end portions; first 8-shaped reinforcing means embedded in said coupling member and including oblique portions crossing each other in said yoke portion of said coupling member and extending to the ends of said lateral edges, and a pair of transverse end faces and being integral with said oblique portions; and second reinforcing means embedded in said coupling member and including a pair of U-shaped lateral reinforcing portions respectively extending along said U-shaped lateral edges and into said end portions and a pair of transverse portions respectively connecting the ends of said lateral U-shaped reinforcing portions and being located along said transverse edges of said free end portions of said coupling member, said first and second reinforcing means consisting of cords wound in an endless strand.

10. A coupling means comprising an elastic U-shaped coupling member consisting of a resilient material and including a yoke portion curved in one direction only and two leg portions having free end portions adapted to be attached to a pair of coupling discs, said coupling member having a pair of lateral U-shaped edges bounding said yoke portion and said leg portions and a pair of transverse end faces along said free end portions; first 8-shaped reinforcing means embedded in said coupling member and including oblique portions crossing each other in said yoke portion of said coupling member and extending to the ends of said lateral edges, and a pair of transverse portions located in said free end portions along said transverse end faces and being integral with said oblique portions; and second reinforcing means embedded in said coupling member and including a pair of U-shaped lateral reinforcing portions respectively extending along said U-shaped lateral edges and into said end portions and a pair of transverse portions respectively connecting the ends of said lateral U-shaped reinforcing portions and being located along said transverse end faces of said free end portions of said coupling member and in a plane passing through said transverse portions of said first reinforcing means parallel to said end faces.

11. A coupling means comprising an elastic U-shaped coupling member consisting of a resilient material and including a yoke portion curved in one direction only and two leg portions having free end portions adapted to be attached to a pair of coupling discs, said coupling member having a pair of lateral U-shaped edges bounding said yoke portion and said leg portions and a pair of transverse end faces along said free end portions; first 8-shaped reinforcing means embedded in said coupling member and including oblique portions crossing each other in said yoke portion of said coupling member and extending to the ends of said lateral edges, and a pair of transverse portions located in said free end portions along said transverse end faces and being integral with said oblique portions; and second reinforcing means embedded in said coupling member and including a pair of U-shaped lateral reinforcing portions respectively extending along said U-shaped lateral edges and into said end portions and a pair of transverse portions respectively connecting the ends of said lateral U-shaped reinforcing portions and being located along said transverse end faces of said free end portions of said coupling member and in a plane passing through said transverse portions of said first reinforcing means parallel to said end faces, said U-shaped coupling member having recesses in the inner faces of said leg portions forming shoulders adjacent said transverse portions of said first reinforcing means for receiving lugs of the coupling discs.

12. An elastic coupling comprising, in combination, two oppositely arranged rotary coupling discs; a set of elastic coupling members arranged spaced from each other along the peripheral portions of said coupling discs, each coupling member consisting of a resilient material and including a yoke portion and two leg portions having free end portions respectively secured to said coupling discs, each coupling member having a pair of lateral edges bounding said yoke portion and said leg portions; first reinforcing means embedded in said coupling member and including oblique portions crossing each other in said yoke portion of said coupling member, and transverse portions located in said free end portions of said coupling member; second reinforcing means embedded in said coupling member and including a pair of lateral reinforcing portions respectively extending along said lateral edges and into said end portions of said coupling member; and a pair of transverse portions respectively connecting the ends of said lateral reinforcing portions of said second reinforcing means and being located in said free end portions of said coupling member.

13. An elastic coupling comprising, in combination, two oppositely arranged rotary coupling discs having opposite inner faces respectively formed with inwardly projecting lugs; a set of elastic coupling members arranged spaced from each other along the peripheral portions of said coupling discs, each coupling member consisting of a resilient material and including a yoke portion and two leg portions having free end portions respectively secured to said coupling discs, each coupling member having a pair of lateral edges bounding said yoke portion and said leg portions, said coupling member being arcuate and having an inner face formed with a pair of opposite recesses located in the region of said leg portions and receiving opposite projecting lugs of said two coupling discs; first reinforcing means embedded in said coupling member and including oblique portions crossing each other in said yoke portion of said coupling member, and transverse portions located in said free end portions of said coupling member, said first reinforcing means consisting of cords wound in an endless 8-shaped strand having two loops surrounding, respectively, said recesses in said coupling member for reinforcing the same against the forces exerted by said lugs of the coupling discs; and second reinforcing means embedded in said coupling member and including a pair of lateral reinforcing portions respectively extending along said lateral edges of said coupling member and a pair of transverse portions respectively connecting the ends of said lateral reinforcing portions and being located in said free end portions of said coupling member, said second reinforcing means consisting of cords wound in an endless strand.

References Cited in the file of this patent

UNITED STATES PATENTS

| 1,424,051 | Wayne | July 25, 1922 |
| 1,483,561 | Ungar | Feb. 12, 1924 |
| 1,759,356 | Kattwinkel | May 20, 1930 |
| 2,073,852 | Radford | Mar. 16, 1937 |
| 2,648,958 | Schlotmann | Aug. 18, 1953 |